US011027235B2

(12) United States Patent
Dube

(10) Patent No.: US 11,027,235 B2
(45) Date of Patent: Jun. 8, 2021

(54) METHOD AND APPARATUS FOR REAGENT RECOVERY IN A FLUE GAS PROCESSING SYSTEM

(71) Applicant: General Electric Technology GmbH, Baden (CH)

(72) Inventor: Sanjay Kumar Dube, Knoxville, TN (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/083,713

(22) Filed: Mar. 29, 2016

(65) Prior Publication Data

US 2016/0288050 A1    Oct. 6, 2016

Related U.S. Application Data

(60) Provisional application No. 62/139,853, filed on Mar. 30, 2015.

(51) Int. Cl.
*B01D 53/78* (2006.01)
*B01D 53/14* (2006.01)
(Continued)

(52) U.S. Cl.
CPC ......... *B01D 53/78* (2013.01); *B01D 53/1418* (2013.01); *B01D 53/1425* (2013.01); *B01D 53/1475* (2013.01); *B01D 53/18* (2013.01); *B01D 53/502* (2013.01); *B01D 53/504* (2013.01); *B01D 53/62* (2013.01);
(Continued)

(58) Field of Classification Search
CPC ..... Y02E 20/326; Y02E 20/363; Y02C 10/06; Y02C 20/40; B01D 53/1475; B01D 2252/102; B01D 53/50; B01D 53/62; B01D 61/445; B01D 53/501; B01D 53/78; B01D 53/1418; B01D 53/965; B01D 53/18; B01D 53/502; B01D 53/504; B01D 53/75; B01D 53/1425; B01D 2257/504; B01D 2251/2062; B01D 2251/506; B01D 2258/0283; F28D 15/00; F23J 2219/40; F23J 2215/20; F23J 15/06; F23J 2215/50;
(Continued)

(56) References Cited

U.S. PATENT DOCUMENTS 4,552,635 A * 11/1985 Jenczewski .......... B01D 53/501
204/534
5,910,611 A  6/1999 Gregory, Jr. et al.
(Continued)

OTHER PUBLICATIONS

Extended European Search Report and Opinion issued in connection with corresponding EP Application No. 16162927.4 dated Aug. 16, 2016.

*Primary Examiner* — Anthony J Zimmer
*Assistant Examiner* — Syed T Iqbal
(74) *Attorney, Agent, or Firm* — Grogan, Tuccillo & Vanderleeden, LLP

(57) ABSTRACT

A system and method is disclosed for recovering reagents that are used in removing contaminants from a flue gas stream. The system and method includes contacting the flue gas stream with reagents such as ammonia and sulfuric acid to create an ammonium sulfate stream. The ammoniated sulfate stream is forwarded to an electrodialysis unit wherein the reagents are regenerated and recirculated back to the system.

8 Claims, 3 Drawing Sheets

(51) Int. Cl.
  *B01D 53/96* (2006.01)
  *C25B 9/19* (2021.01)
  *B01D 53/18* (2006.01)
  *B01D 53/50* (2006.01)
  *B01D 53/62* (2006.01)
  *B01D 53/75* (2006.01)
  *C25B 7/00* (2006.01)

(52) U.S. Cl.
  CPC .......... *B01D 53/75* (2013.01); *B01D 53/965* (2013.01); *C25B 7/00* (2013.01); *C25B 9/19* (2021.01); *B01D 2251/2062* (2013.01); *B01D 2251/506* (2013.01); *B01D 2252/102* (2013.01); *B01D 2257/504* (2013.01); *B01D 2258/0283* (2013.01); *Y02C 20/40* (2020.08); *Y02P 20/151* (2015.11)

(58) Field of Classification Search
  CPC .......... F23J 15/04; C01B 17/745; C25B 9/19; C25B 7/00; Y02P 20/151
  See application file for complete search history.

(56) References Cited

U.S. PATENT DOCUMENTS

| | | | |
|---|---|---|---|
| 5,910,711 A | 6/1999 | Greogry, Jr. et al. | |
| 2008/0128291 A1 | 6/2008 | Meeseen et al. | |
| 2013/0175004 A1* | 7/2013 | Dube | F28D 15/00 165/61 |
| 2013/0333568 A1 | 12/2013 | Bockman et al. | |

\* cited by examiner

METHOD AND APPARATUS FOR REAGENT RECOVERY IN A FLUE GAS PROCESSING SYSTEM

CROSS-REFERENCE TO RELATED APPLICATION

This application claims the benefit of U.S. Provisional Application Ser. No. 62/139,853, filed on Mar. 30, 2015, entitled "METHOD AND APPARATUS FOR REAGENT RECOVERY IN A FLUE GAS PROCESSING SYSTEM" which is incorporated herein by reference in its entirety.

BACKGROUND

The present disclosure generally relates to systems and processes for removing and capturing contaminants such as carbon dioxide ($CO_2$) entrained in flue gases. More particularly, the present disclosure relates to recycling and recovering the reagents that are used in the $CO_2$ capture processes. One example of a $CO_2$ capture process is known as a chilled ammonia process (CAP). Typically, in a CAP process, removing $CO_2$ involves chemically absorbing $CO_2$ via a reagent such as ammonia and regenerating the reagent in a regeneration process. Other reagents may also be used for removing or capturing other contaminants and likewise recovered in the overall $CO_2$ capture process.

Most of the energy used in the world is derived from the combustion of carbon and hydrogen-containing fuels such as coal, oil and natural gas. The combustion of such fuels generally results in the production of flue gas streams that contain various contaminants in the form of ash, $CO_2$, sulfur compounds (often in the form of sulfur oxides, commonly referred to as '$SO_x$, e.g., $SO_2$, $SO_3$ and the like), nitrogen compounds, (often in the form of nitrogen oxides referred to as "$NO_x$"), chlorine, mercury, and other trace elements. Awareness regarding the damaging effects of the contaminants released during combustion triggers the enforcement of ever more stringent limits on emissions from power plants, refineries and other industrial processes. There is an increased pressure on operators of such plants to achieve near zero emission of such contaminants. Numerous processes and systems have been developed in response to the desire to achieve near zero emission of contaminants.

SUMMARY

The gas purification system 1 for removal of gaseous acidic components and water soluble contaminants from a gas stream comprises a direct contact cooler in fluid communication with a flue gas, wherein the direct contact cooler comprises a recirculation loop configured to cool the flue gas and remove contaminants such as $SO_x$ with an aqueous ammoniated solution, forming an ammoniated sulfate stream. The gas purification system 1 also comprises a direct contact heating (DCH) column 14 which receives flue gas leaving a $CO_2$ absorber device 12 and removes residual ammonia by contacting the flue gas with sulfuric acid, forming an ammonium sulfate byproduct. The direct contact cooling (DCC) device 10 and DCH 14 are in fluid communication with each other as well as the $CO_2$ absorber 12. The gas purification system 1 further comprises an electrodialysis unit 16 that is in fluid communication with the DCC 10, DCH 14 and $CO_2$ absorber 12 and is configured to electrolytically generate hydrogen and hydroxyl ions that selectively react with the ammonium sulfate ions to produce a sulfuric acid product stream and an ammonium hydroxide product stream. The regenerated sulfuric acid and ammonium hydroxide streams are thus able to be recycled back to the system and reused to capture contaminants.

The disclosure may be understood more readily by reference to the following detailed description of the various features of the disclosure and the examples included therein.

DETAILED DESCRIPTION

Figure 1:
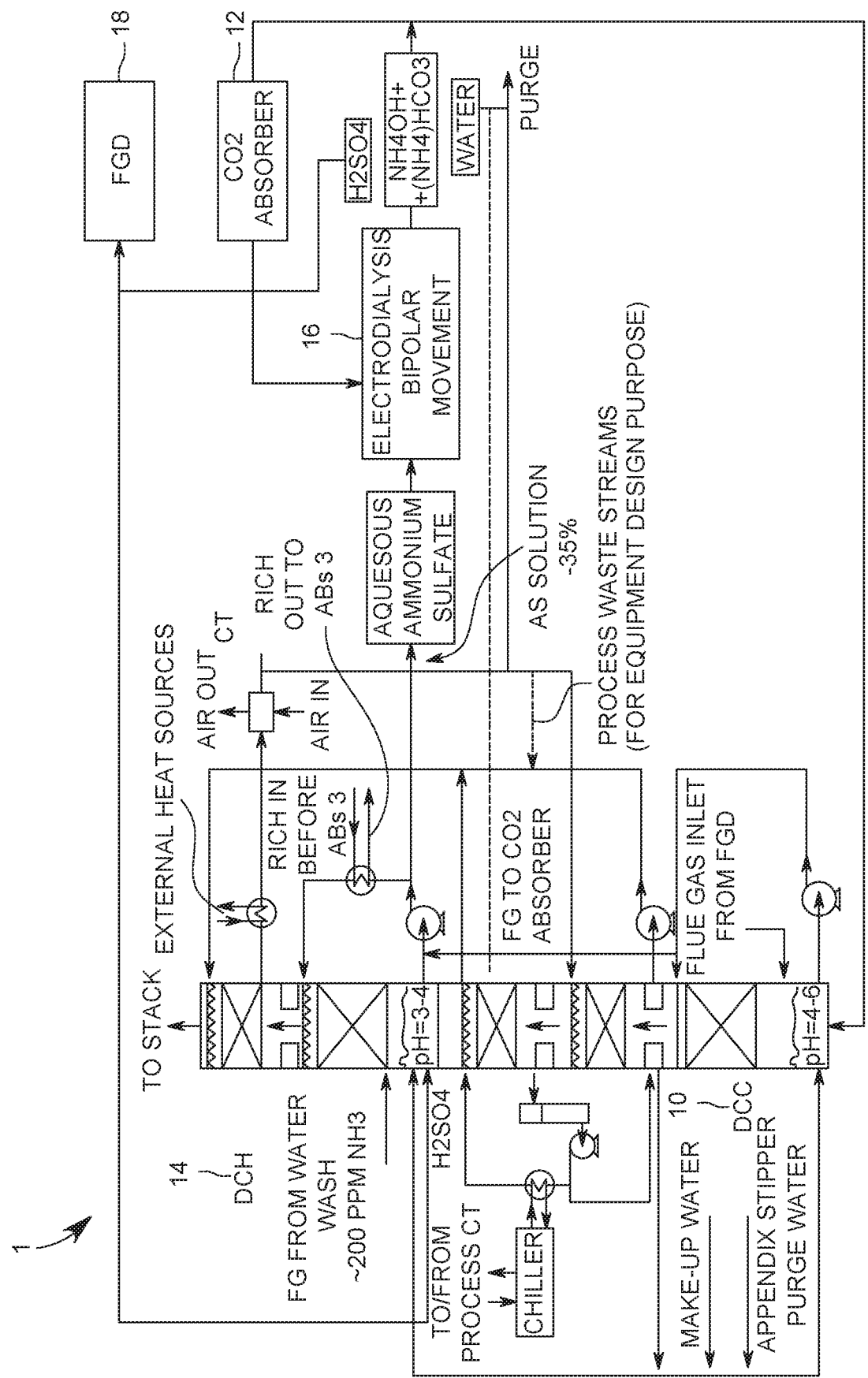
FIG. 1 is an overall diagram of an integrated gas purification system and electrodialysis unit

Disclosed herein are systems and processes for recovering and recycling reagents that are used in processes used in the removal of contaminants from a combustion flue gas such as $CO_2$ and $SO_x$. In particular, reference is made herein to chilled ammonia processes (CAP) and related technology for $CO_2$ absorption and apparatuses.

For example, in most $CO_2$ absorption processes, prior to forwarding a flue gas to a $CO_2$ capture plant, it is desirable to first treat the flue gas for removal of sulfur oxides. Systems and processes for $SO_x$ removal include, but are not limited to, desulfurization systems such as wet flue gas desulfurization systems (WFGD), dry flue gas desulfurization systems (DFGD), particulate filters (including, for example, bag houses, particulate collectors, and the like), as well as the use of one or more sorbents that absorb contaminants from the flue gas. Examples of sorbents include, but are not limited to, activated carbon, ammonia, limestone, and the like. While the flue gas desulfurization processes used to remove $SO_x$ contaminants are effective, they may not be 100% efficient, hence residual $SO_x$ may remain in the flue gas prior to the flue gas being treated for $CO_2$ removal. This residual $SO_x$ in the incoming flue gas is captured using ammonia in a flue gas cooling and cleaning stage within the CAP, for example, within a direct contact cooling device (DCC) 10 which produces an ammoniated sulfate byproduct.

After the cooling and cleaning stage, the flue gas is then forwarded to a $CO_2$ absorber 12 wherein the flue gas is brought into contact with an ammoniated solution or slurry in order to absorb the $CO_2$ into the ammoniated solution, thus forming a $CO_2$-rich solution and a $CO_2$-lean flue gas. While the majority of the ammonia leaves the $CO_2$ absorber 12 with the $CO_2$-rich solution, a portion of the ammonia leaves the $CO_2$ absorber 12 with the $CO_2$-lean flue gas. In the current Chilled Ammonia Process (CAP) technology, ammonia in the flue gas may be captured, for example, in a direct contact heating (DCH) device 14 using a sulfuric acid rinse prior to release to the atmosphere. This process also forms an ammonium sulfate byproduct.

In both unit operations, an ammonium sulfate byproduct is formed and further processed for use as a commercial fertilizer. The ammonium sulfate byproduct is transported from the CAP as a concentrated liquid solution or processed on-site using crystallization technology to form a granular product. Depending on the plant location, market, and other site specific factors, the economic justification and feasibility to produce a commercial grade ammonium sulfate fertilizer may not be attractive.

Further, the on-site storage requirements for large amounts of the reagents needed for $CO_2$ capture facilities on large power generation facilities can be problematic due to permitting requirements for ammonia, for example.

As such, there is a need for improved systems to eliminate the operating and capital costs associated with the processing of ammonium sulfate byproduct from the CAP and to significantly reduce the consumption of ammonia and sulfuric acid reagents.

In general, the chilled ammonia process can be divided into systems that include a flue gas cooling and cleaning system, a $CO_2$ absorption system, a water wash system and a regeneration system. Additionally, a chiller system may be included.

In a chilled ammonia process, $CO_2$ is absorbed in an ammoniated solution at temperatures lower than the exit temperature from the flue gas desulfurization system. As such, it is necessary to cool the flue gas prior to $CO_2$ absorption. For example, the flue gas exiting the flue gas desulfurization unit is typically at a temperature of about 50-60° C. for WFGD systems and about 80-100° C. for DFGD systems. The DCC 10 and an optional chiller provide the necessary cooling of the flue gas prior to carbon dioxide absorption in an absorption unit. The DCC 10 is also used to remove water by condensation from the incoming flue gas. In the present invention, ammonia is introduced into the DCC 10 and reacts with any acidic gases such as $SO_x$ (e.g., $SO_2$, $SO_3$), entrained in the flue gas to form an ammonium sulfate byproduct.

The chilled flue gas is then forwarded to and enters the $CO_2$ absorber system that comprises a $CO_2$ absorber unit 12, where the unit may include multiple packed bed stages and conduits for circulation within the unit. In the $CO_2$ absorption system, the flue gas is contacted with a first wash liquid comprising ammonia solution or slurry, e.g., by bubbling the flue gas through the first wash liquid or by spraying the first wash liquid into the flue gas. In the $CO_2$ absorption system, $CO_2$ from the flue gas is absorbed in the first wash liquid, forming a flue gas depleted of $CO_2$ (also known as a $CO_2$-lean flue gas) which may also contain ammonia, and a $CO_2$-rich ammoniated solution or slurry which is forwarded to the regeneration system for further processing.

The flue gas depleted of $CO_2$ then enters the water wash system for gaseous ammonia slip control. In the water wash section, contaminants such as ammonia, remaining in the flue gas when it leaves the $CO_2$ absorption section are absorbed. The water wash section is arranged to allow contact between the flue gas and a second wash liquid, which is generally water.

The flue gas from the water wash system is then forwarded to the direct contact heating (DCH) system 14 to scrub the remaining ammonia from the flue gas and to re-heat the treated flue gas. In the DCH 14 the flue gas is contacted with sulfuric acid to neutralize any ammonia contained therein thus forming an ammonium sulfate byproduct stream. The treated/cleaned flue gas leaving the DCH 14 is sent via a stack to atmosphere. As mentioned above, the $CO_2$-rich solution from the $CO_2$ absorber 12 is forwarded to the regeneration system. There, it is heated by means of steam in the regenerator to desorb primarily $CO_2$, forming a $CO_2$-rich gas, which exits the regenerator top or overhead, and a $CO_2$-lean ammoniated solution, which exits the regenerator bottom.

The $CO_2$-lean ammoniated solution exiting from the regenerator bottom is then returned to the $CO_2$ absorber 12 for further capture of $CO_2$. The high purity $CO_2$-rich gas is taken from the regenerator overhead and further conditioned and compressed to meet required specifications.

As will be discussed in greater detail below, the system is closed looped and includes an electrodialysis unit 16 in fluid communication with the DCC, DCH and $CO_2$ absorber for electrolytically regenerating the ammonia and sulfuric acid from the ammonium sulfate by product streams. The electrodialysis unit 16 is configured to dissociate the ammonium sulfate into the corresponding acidic and basic ionic species using an electrical driving force. A suitable electrodialysis unit 16 is a bipolar membrane electrodialysis unit. In one embodiment, the electrodialysis unit 16 for recovery of ammonia and sulfuric acid may be a three-compartment bipolar membrane electrodialysis system.

The electrodialysis unit 16 is in fluid communication with the DCC 10 and DCH 14 to receive the ammonium sulfate feed stream. Under the driving force of an electric field, the electrodialysis unit 16 produces three feed streams: a regenerated sulfuric acid feed stream that can be fed to the flue gas desulfurization unit and the DCH 14, a regenerated ammonium hydroxide feed stream that can be recycled back to the DCC 10 and a water feed stream that can be recycled back to the DCC 10 and/or DCH 14. Optionally, water can be purged from the system depending on the process needs.

Figure 2:
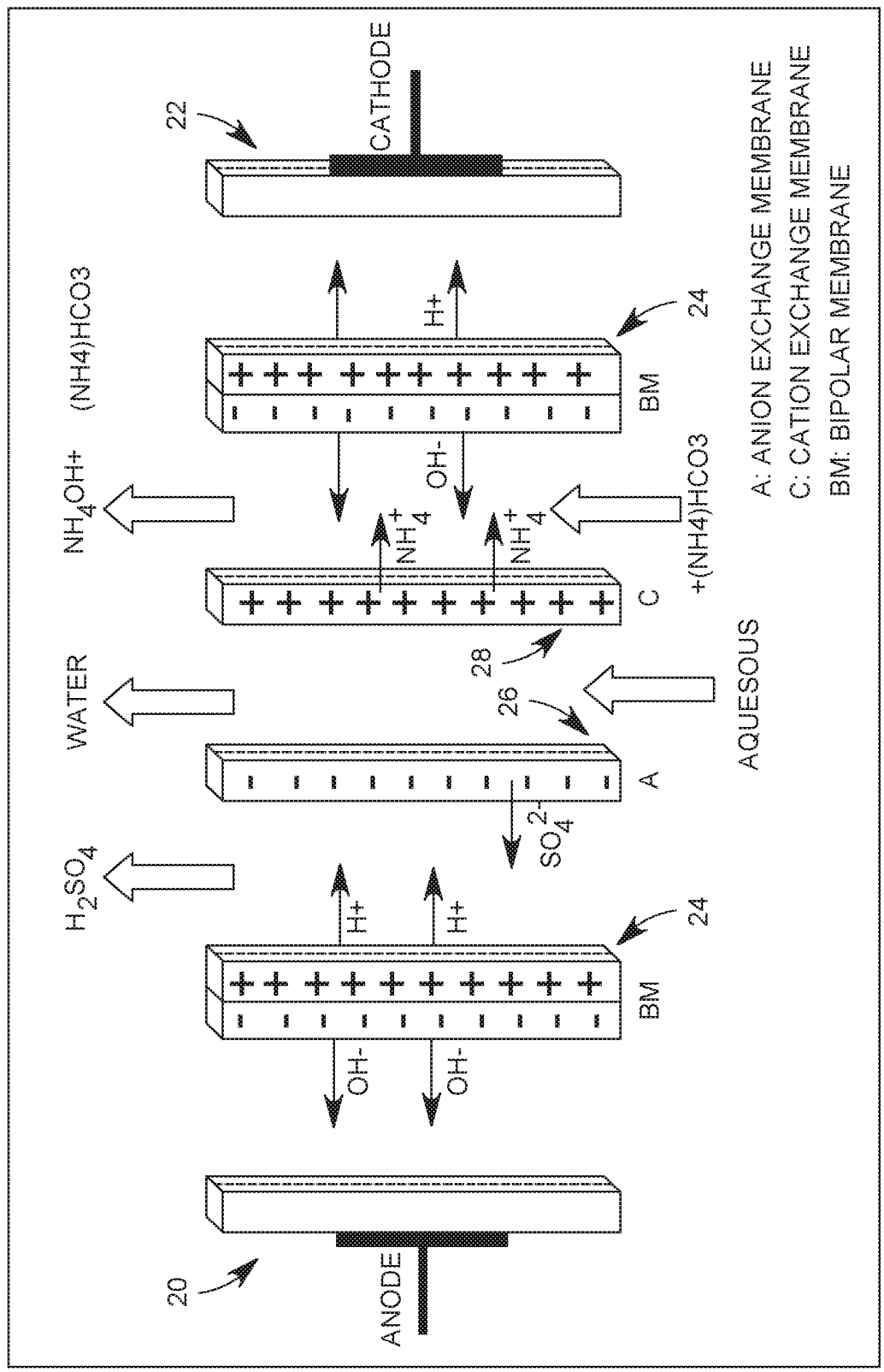
FIG. 2 is a schematic cross sectional representation of a bipolar membrane electrodialysis unit.

As shown more clearly in FIG. 2, the exemplary electrodialysis unit 16 includes an anode 20, cathode 22, bipolar membranes 24, an anion exchange permselective membrane 26 and a cation exchange permselective membrane 28, wherein the anode 20 and cathode 22 are in electrical communication with a source of direct current (not shown). The bipolar membranes 24 consist of an anion exchange membrane and a cation exchange membrane bonded together.

The anode 20 and the cathode 22 may be made of any suitable material based primarily on the intended use of the electrolytic reactor, costs and chemical stability. For example, the anode 20 may be made of a conductive material, such as ruthenium, iridium, titanium, platinum, vanadium, tungsten, tantalum, oxides of at least one of the foregoing, combinations including at least one of the foregoing, and the like. The cathode 22 may be made from stainless steel, steel or may be made from the same material as the anode 20.

As used herein, the term "membrane" generally refers to a sheet for separating adjacent compartments. In this regard, the term "membrane" can be used interchangeably with screen, diaphragm, partition, barrier, a sheet, a foam, a sponge-like structure, a canvas, and the like. The membrane is chosen to be permselective, e.g., a cation exchange membrane, bipolar membrane, or anion membrane. As used herein, the term "permselective" refers to a selective permeation of commonly charged ionic species through the membrane with respect to other diffusing or migrating ionic species having a different charge in a mixture. For example, in a permselective membrane such as a cation exchange membrane, cations can freely pass through the membrane whereas the passage of anions is prevented.

Under the driving force of an electrical field, a bipolar membrane can efficiently dissociate water into hydrogen ($H^+$) and hydroxyl ($OH^-$) ions. The bipolar membranes 24 are oriented such that the anion-exchange side faces the anode 20 and the cation-exchange side faces the cathode 22. The hydroxyl anions are transported across the anion-exchange layer and the hydrogen cations across the cation-exchange layer of the bipolar membrane. These ions are used in the electrodialysis stack to selectively combine with the ammonia containing cations (e.g., $NH_4^+$) and sulfur containing anions (e.g., sulfate ions ($SO_4^{2-}$)) from the aqueous ammonium sulfate solution to produce an acid effluent such as sulfuric acid ($H_2SO_4$), and an ammonium hydroxide (e.g., $NH_4OH$) effluent.

There are substantial advantages to water splitting with the bipolar membrane. Since there are no gases evolved at the surface or within the bipolar membranes, the energy associated with conversion of $O_2$ and $H_2$ is saved. Using bipolar membranes eliminates the need for any additional acid or base solution. Additionally, the present invention eliminates the need for the end user to handle the byproduct stream (i.e., the ammonium sulfate), which will further enhance the efficiency of the CAP.

In another embodiment, for example, as shown in FIG. 1, a slip stream from the $CO_2$ absorber unit 12 (e.g., a $NH_3$—$CO_2$—$H_2O$ mixture such as ammonium bicarbonate) is also provided to the electrodialysis unit 16 in order to enhance the conductivity of the ammonium hydroxide solution, which in turn, enhances the overall electrodialysis performance. Using the ammonium bicarbonate from the $CO_2$ absorber 12 as an additive is particularly beneficial as it is readily available and significantly improves the conductivity of the ammonium hydroxide solution which in turn improves the overall performance of the electrodialysis unit 16.

Figure 3:
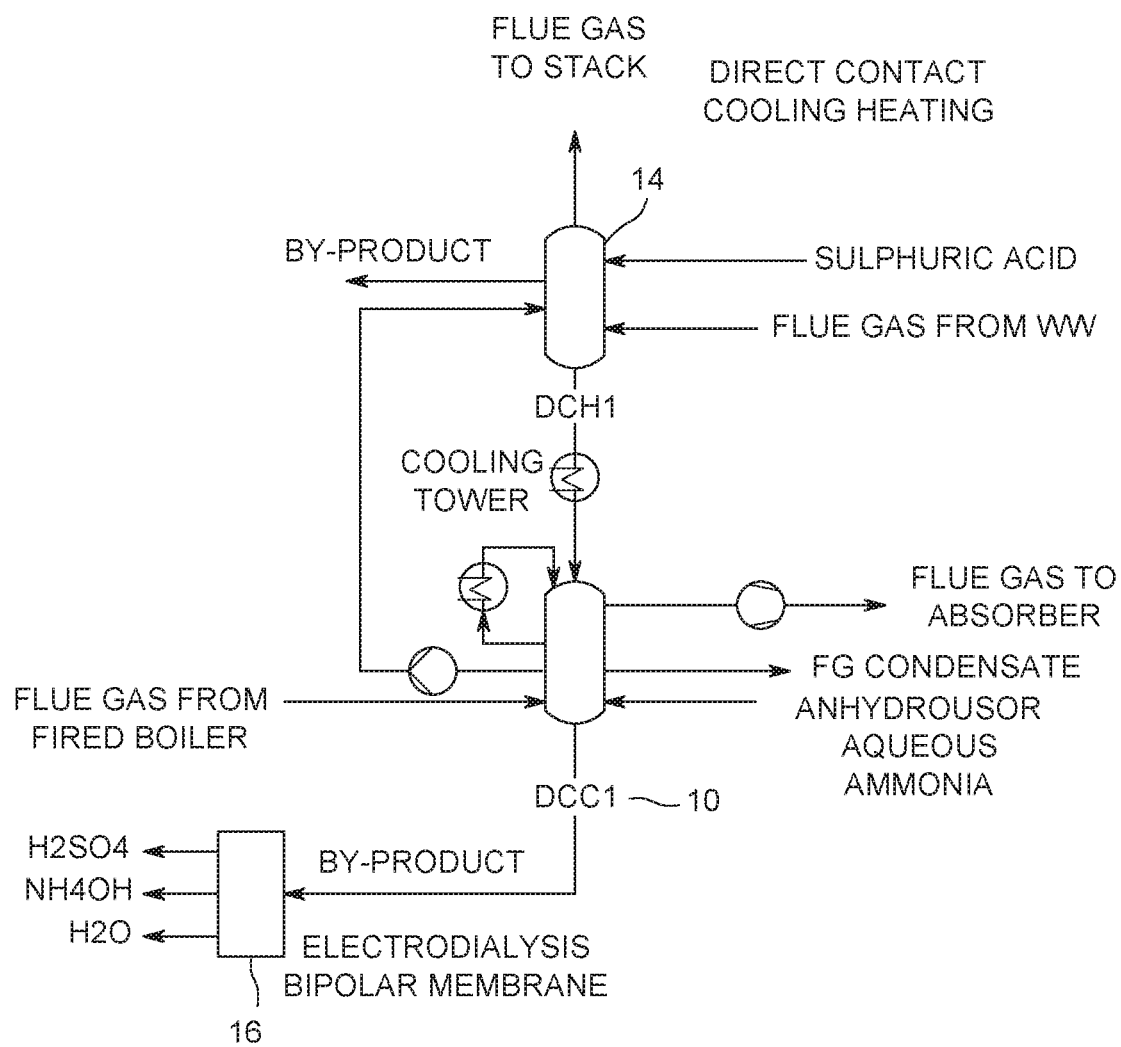
FIG. 3 is a schematic illustration of an exemplary direct contact cooling and heating tower arrangement.

As shown more clearly in FIG. 3, an exemplary DCC 10 and DCH 14 configuration is illustrated. As shown in FIG. 3, the DCC 10 and DCH 14 are in fluid communication with each other and the electrodialysis unit 16. The anhydrous or aqueous ammonia is introduced to the DCC 10. After contact with the flue gas, ammoniated sulfate byproduct formed in the DCC 10 can be fed to the electrodialysis unit 16 for further processing. Additionally, a portion of the ammoniated sulfate byproduct formed in the DCC 10 can be provided to the DCH 14 to increase the overall concentration of the resultant ammonium sulfate stream by evaporating any water in the stream.

The regeneration of the ammonium sulfate byproduct streams via the bipolar membrane electrodialysis is highly integrated with the $CO_2$ capture process and flue gas desulfurization systems. Thus, there is less need for new or additional reagents to be added. As described herein, the system and method provide a means wherein the reagents used in a $CO_2$ capture process are regenerated and recycled back to further remove the flue gas contaminants. Also, as described herein, the integrated systems and methods eliminate any need for removing/crystallizing/storing the unwanted ammonium sulfate byproduct that is formed in the various processes.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for removal of gaseous contaminants including $CO_2$, $SO_X$, from a flue gas stream, the process comprising:
    contacting the flue gas stream with an aqueous ammonia solution in a direct contact cooling device to form an ammoniated sulfate stream;
    forwarding the flue gas stream from the direct contact cooling device to a $CO_2$ absorption device;
    contacting the flue gas stream in the $CO_2$ absorption device with an ammoniated solution or slurry to form a $CO_2$ depleted flue gas stream comprising ammonia and a $CO_2$-rich solution or slurry;
    forwarding the $CO_2$ depleted flue gas stream comprising ammonia to a water wash device to form a $CO_2$ depleted flue gas stream comprising residual ammonia and a used water wash stream;
    forwarding the $CO_2$ depleted flue gas stream comprising residual ammonia to a direct contact heating device;
    contacting the $CO_2$ depleted flue gas stream comprising residual ammonia in the direct contact heating device with sulfuric acid to form an ammoniated sulfate stream and a cleaned flue gas stream;
    releasing the cleaned flue gas stream to atmosphere;
    providing a slip stream from the $CO_2$ absorption device to a bipolar membrane electrodialysis unit; and
    regenerating an aqueous ammonia solution and sulfuric acid from the ammoniated sulfate stream from the direct contact cooling device and the ammoniated sulfate stream from the direct contact heating device to the bipolar membrane electrodialysis unit to form a regenerated ammonium hydroxide stream, a regenerated sulfuric acid stream and a water stream.

2. The process of claim 1, further comprising providing the regenerated ammonium hydroxide stream to the direct contact cooling device and the regenerated sulfuric acid stream to the direct contact heating device.

3. The process of claim 1, further comprising providing the water stream from the electrodialysis unit to the direct contact cooling device.

4. The process of claim 1, wherein the $SO_X$ is selected from the group consisting of $SO_2$ and $SO_3$.

5. The process of claim 1, further comprising contacting the flue gas stream with a cooled water stream in the direct contact cooling device to provide a cooled flue gas stream.

6. The process of claim 5, further comprising cooling the flue gas stream to less than 50° C.

7. The process of claim 1, wherein:
    the slip stream is a $NH_3$—$CO_2$—$H_2O$ mixture.

8. The process of claim 7, wherein:
    the $NH_3$—$CO_2$—$H_2O$ mixture is ammonium bicarbonate.

* * * * *